(12) United States Patent
Hyun

(10) Patent No.: US 10,485,226 B2
(45) Date of Patent: Nov. 26, 2019

(54) FISHING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/028,807

(22) Filed: Jul. 6, 2018

(65) Prior Publication Data

US 2019/0014763 A1 Jan. 17, 2019

(30) Foreign Application Priority Data

Jul. 12, 2017 (KR) .................. 10-2017-0088231

(51) Int. Cl.
*A01K 89/01* (2006.01)
*A01K 89/015* (2006.01)

(52) U.S. Cl.
CPC .... *A01K 89/01123* (2015.05); *A01K 89/0192* (2015.05); *A01K 89/01921* (2015.05)

(58) Field of Classification Search
CPC ................ A01K 89/01921; A01K 89/0193
See application file for complete search history.

(56) References Cited

U.S. PATENT DOCUMENTS

| 4,821,978 | A | * | 4/1989 | Kaneko | ............ | A01K 89/01921 242/310 |
| 4,899,953 | A | * | 2/1990 | Toda | ................ | A01K 89/01921 242/268 |
| 5,127,603 | A | * | 7/1992 | Morimoto | .......... | A01K 89/0192 242/279 |
| 5,377,925 | A | * | 1/1995 | Miyazaki | ......... | A01K 89/01921 242/312 |
| 5,577,680 | A | * | 11/1996 | Ikuta | ................ | A01K 89/01922 242/313 |
| 5,810,274 | A | * | 9/1998 | Cockerham | ...... | A01K 89/01921 242/314 |
| 5,873,535 | A | * | 2/1999 | Jeung | ............... | A01K 89/01923 242/314 |
| 6,032,894 | A | * | 3/2000 | Chapman | ......... | A01K 89/01931 242/310 |

(Continued)

FOREIGN PATENT DOCUMENTS

KR 100148673 10/1998
KR 200174209 3/2000

(Continued)

*Primary Examiner* — Emmanuel M Marcelo
(74) *Attorney, Agent, or Firm* — Cantor Colburn LLP

(57) ABSTRACT

Provided is a fishing reel having a downward-rotation locking type side cover in which the portion where a frame and a side cover are in contact with each other is curved; a protruding portion and a recessed portion that are smoothly connected to each other are formed respectively at a first edge of the frame and a second edge of a palm-side first side cover to prevent injuries in use due to the a pointed end of the frame; the internal angle of a first corner connecting the upper inclined surface and the outer side of the protruding portion is an obtuse angle; and the first side cover can be locked by rotating downward the front end of the first side cover after the first side cover is coupled to a mount with the protruding portion under the recessed portion.

4 Claims, 8 Drawing Sheets

(56) References Cited

U.S. PATENT DOCUMENTS

| | | | |
|---|---|---|---|
| 2004/0075005 A1* | 4/2004 | Myojo | A01K 89/01921 |
| | | | 242/310 |
| 2005/0056716 A1* | 3/2005 | Kawasaki | A01K 89/00 |
| | | | 242/310 |
| 2005/0224617 A1* | 10/2005 | Nakagawa | A01K 89/01922 |
| | | | 242/310 |
| 2014/0158803 A1* | 6/2014 | Hyun | A01K 89/015 |
| | | | 242/310 |
| 2014/0263792 A1* | 9/2014 | Takechi | A01K 89/015 |
| | | | 242/257 |
| 2016/0345562 A1* | 12/2016 | Baldwin | A01K 89/01922 |
| 2016/0366866 A1* | 12/2016 | Sim | A01K 89/01921 |

FOREIGN PATENT DOCUMENTS

| | | |
|---|---|---|
| KR | 101019509 | 3/2011 |
| KR | 101188291 | 10/2012 |
| KR | 20160149431 | 12/2016 |

* cited by examiner

FISHING REEL

BACKGROUND OF THE INVENTION

Field of the Invention

The present invention relates to a fishing reel having a downward-rotation locking type side cover. More particularly, the present invention relates to a fishing reel having a downward-rotation locking type side cover in which the portion where a frame and a side cover are in contact with each other is curved; a protruding portion and a recessed portion that are smoothly connected to each other are formed respectively at a first edge of the frame and a second edge of a palm-side first side cover to prevent an injury in use due to the a pointed end of the frame; the internal angle of a first corner connecting the upper inclined surface and the outer side of the protruding portion is an obtuse angle; and the first side cover can be locked by rotating downward the front end of the first side cover after the first side cover is coupled to a mount with the protruding portion under the recessed portion.

Description of the Related Art

In general, fishing reels, particularly, bait casting reels are different only in that the operation structure of a brake dial or a tension nut according to the braking method of a spool, and they include a frame with a spool mounted thereon, a palm-side first side cover, a gear-side second side cover coupled to a second side of the frame, and a handle disposed on the second side cover.

In these fishing reels, the second side cover that is relatively less frequently opened/closed is firmly fastened to the frame for example by bolting.

Users may open, separate, and recombine the first side cover that is relatively frequently opened/closed while fishing and then keep fishing under various environments, for example, in the cases of separating a spool to repair the fishing reel or regulating a brake shoe of a centrifugal brake type to prevent backlash, when the user fishes not only on a flat ground area, but a slope such as a rock.

Various coupling structures for opening/closing the first side cover are applied to the fishing reels. The fundamental purpose of a mechanism for opening/closing is to recombine and safely fix the first side cover after the first side cover is completely separated.

In the fishing reels of the related art, a structure that can lock and unlock a first side cover only by rotating a first side cover with respect to a frame with a small force even without operating a specific locking device is used for users to easily attach/detach the first side cover to/from the frame.

Relevant structures have been disclosed in Korean Utility Model No. 20-0174209, Korean Patent No. 10-1188291, and Korean Patent No. 10-1019509. As disclosed in these documents, a fishing reel having a rotary opening/closing type side cover of the related art has a structure in which the contact surfaces between a frame and the first side cover are straight flat surfaces having the same height.

Meanwhile, in order to satisfy design-related needs of users, some fishing reels have a structure in which a portion of a frame, particularly, some section of the front upper portion of a frame is curved by smoothly protruding and extending toward both side covers and the portions, which correspond to the curved portion, of the side covers are smoothly recessed outward.

That is, fishing reels should be formed in a circular or elliptical shape when seen from the front so that users can more comfortably hold the fishing reels. As shown in FIG. 1, there is a fishing reel formed in an external shape similar to the shape of the seams of a baseball by applying a curved design of a substantially -shape having a protruding portion 16P and a concave portion 26 connected to each other in a predetermined section of the front upper portions of a frame 10 and side covers 20 and 30.

According to the fishing reel having this curved design of the related art, the protruding portion 16P and the concave portion 26 interfere with each other when the first side cover 20 is rotated forward/backward, thereby limiting the rotational opening/closing directions of the first side cover 16. Accordingly, an up-rotational locking structure that couples the first side cover 20 to the frame 10 by rotating upward the first side cover 20 and separates the first side cover 20 from the frame 10 by rotating downward the first side cover 20 has to be applied to the fishing reel in order to solve the above problem.

That is, in a structure that locks the first side cover 20 primarily coupled to the frame 10 by rotating it downward and separates the first side cover 20 by rotating it upward, the protruding portion 16P of the frame 10 is disposed in the rotational range of the first side cover 20, whereby interference occurs. Accordingly, fishing reels having a curved design in the related art all employ a structure that opens/closes a side cover by rotating it upward.

In this case, as shown in FIGS. 8A and 8B, the contact surfaces of a protruding portion of a frame 1 and a concave portion of a first side cover 20 have to be in close contact with each other in a predetermined area or more to be able to prevent infiltration of water. Accordingly, a stepped structure receiving the edge of the first side cover has to be unavoidably applied to the lower end of the edge of a frame in the fishing reels having a curved design in the related art.

These fishing reels of the related art cause the following problems in use.

First, for the upward-rotation locking type side cover-opening/closing structure, the edge of a first side of the frame 1 has to cover the edge of a second side of a first side cover 2 for close contact between the frame 1 and the first side cover 2. Accordingly, when the top of the frame is inclined, an edge 1a connecting the inclined top and an outer side has an acute angle (≤90°) and becomes pointed, so a user may be injured, that is, may cut his/her the finger with the end of the frame 1 when using the fishing reel.

If the frame 1 is made thicker to prevent this problem, the difference in height between the frame 1 and the first side cover 2 increases, so the thickness (or height) of the first side cover 2 has also to be increased to remove the difference, which runs counter to the tendency to making fishing reels thin and compact.

Furthermore, a user has to hold and rotate the first side cover 2 with one hand (usually the right hand) to lock it with the frame 1 in the other hand (left hand), so, in this process, when the user holds the first side cover 2 wrong, the skin is stuck and injured between the frame 1 and the first side cover 2.

SUMMARY OF THE INVENTION

The present invention has been made in an effort to solve the problems and an object of the present invention is to provide a fishing reel having a downward-rotation locking type side cover, the fishing reel having a curved connecting portion between a frame and a side cover, as in the related art, to satisfy the functional term of comfortable grip and design-related needs and being able to prevent an injury in use by employing a downward-rotation locking type side cover-opening/closing structure with a smooth end having an obtuse angle (≥90°) of the frame, unlike the common upward-rotation locking type side cover of the related art.

Another object of the present invention is to provide a fishing reel having a downward-rotation locking type side cover in which an inner contact surface extends from an end of the inner side of a first side cover at an angle corresponding to the slope of the inclined top of a first edge so that a protruding portion and a concave portion are connected in horizontally close contact with each other in a predetermined area or more to be able to improve the function of preventing infiltration of water.

Another object of the present invention is to provide a fishing reel having a downward-rotation locking type side cover in which front and rear ends of an inner contact surface of a concave portion are connected to an inner end of a flat portion of a second edge and the inner contact surface increases in width and in slope with respect to the vertical direction in an arc shape as it goes to the center in order to minimize friction with a frame when a first side cover is rotated forward and backward to be opened and closed.

Another object of the present invention is to provide a fishing reel having a downward-rotation locking type side cover, the fishing reel including an opening/closing guide that horizontally moves a first side cover to the left and right with respect to a frame when the first side cover is rotated forward and backward to be opened and close so that the first side cover can be easily attached and detached by naturally moving outward away from the frame when it is rotated upward to be separated.

In order to achieve the objects of the present invention, a fishing reel includes: a frame having first and second mount on both sides; a palm-side first side cover coupled to the first mount; and a gear-side second side cover coupled to the second mount, in which a first edge forming the first mount has a protruding portion smoothly extending such that a portion of an upper front portion protrudes from a first flat portion, a second edge of the first side cover has a recessed portion smoothly extending such that an upper front portion is recessed from a second flat portion to be in contact with the protruding portion, an internal angle of a first corner connecting an upper inclined surface and an outer side of the protruding portion is an obtuse angle, and the first side cover is locked by rotating downward a front end of the first side cover after the first side cover is primarily coupled to the first mount with the protruding portion under the recessed portion.

The first side cover may have an inner contact surface extending from an end of an inner side at an angle corresponding to a slope of the upper inclined surface of the first edge, and the inner contact surface may be in contact with the upper inclined surface when the first side cover is locked.

The inner contact surface of the recessed portion may be formed in an arc shape in which front and rear ends are connected to inner ends of the second flat portion of the second edge and the inner contact surface increases in width and in slope with respect to a vertical direction as it goes toward a center.

An opening/closing guide moving the first side cover to the left and right with respect to the frame when the first side cover is rotated forward/backward to be opened/closed may be formed inside one or both of the first mount and the first side cover.

According to the fishing reel of the present invention, the portion connecting a frame and a side cover is curved, as in the related art, to satisfy the functional and design-related needs and a first side cover is designed in a downward-rotation locking type with a smooth end having an obtuse angle of the frame smooth, unlike the common upward-rotation locking type of the related art, thereby being able to prevent injuries such as scratch on fingers by the frame and pinching of a finger between the frame and the side cover while the side cover is opened/closed.

Furthermore, the edge of the first side cover naturally covers the edge of the frame due to the downward-rotation locking type side cover, so a more aesthetic curved design can be achieved and the function of preventing infiltration of water by hiding the curved edge (protruding portion) of the frame.

Furthermore, it is possible to prevent damage and breakage of parts such as wear by providing a mechanical curved design that can minimize friction between the frame and the side cover when the side cover is opened or closed.

Furthermore, when the first side cover is rotated to be opened or closed, the first side cover can be naturally moved horizontally coaxially with a spool shaft, so it is possible to more easily and conveniently rotate the first side cover to open and close it.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
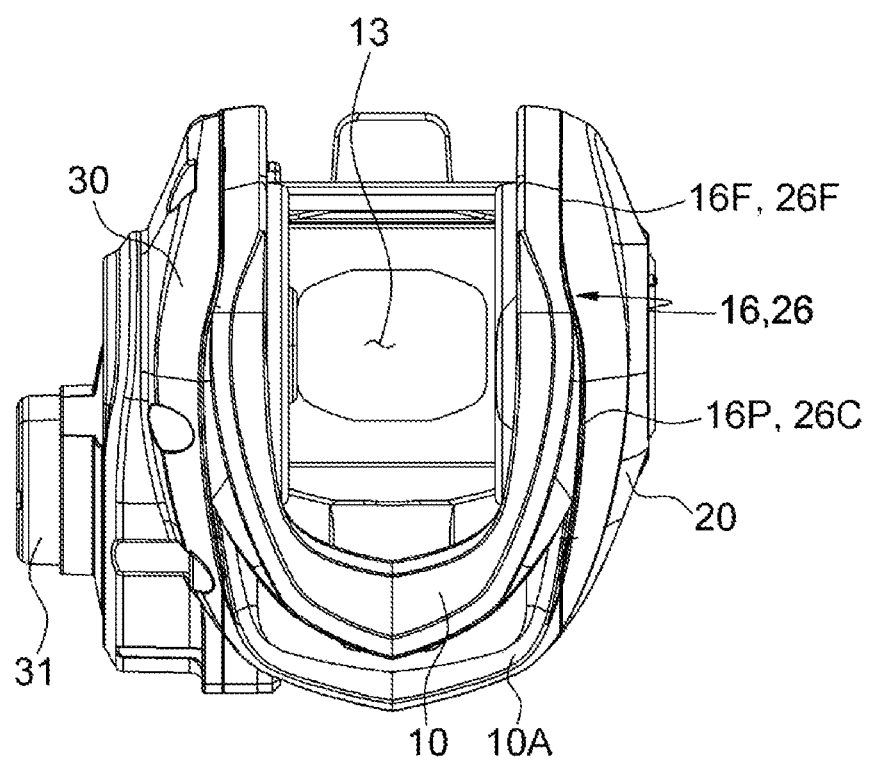
FIGS. 1 and 2 are plan views of a fishing reel according to the present invention.

The present invention may be modified in various ways and implemented by various exemplary embodiments, so that aspect (or embodiments) will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "includes" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from another constitutive element, but constitutive element should not be limited to a manufacturing order, and the terms described in the detailed description of the invention may not be consistent with those described in the claims.

Figure 2:
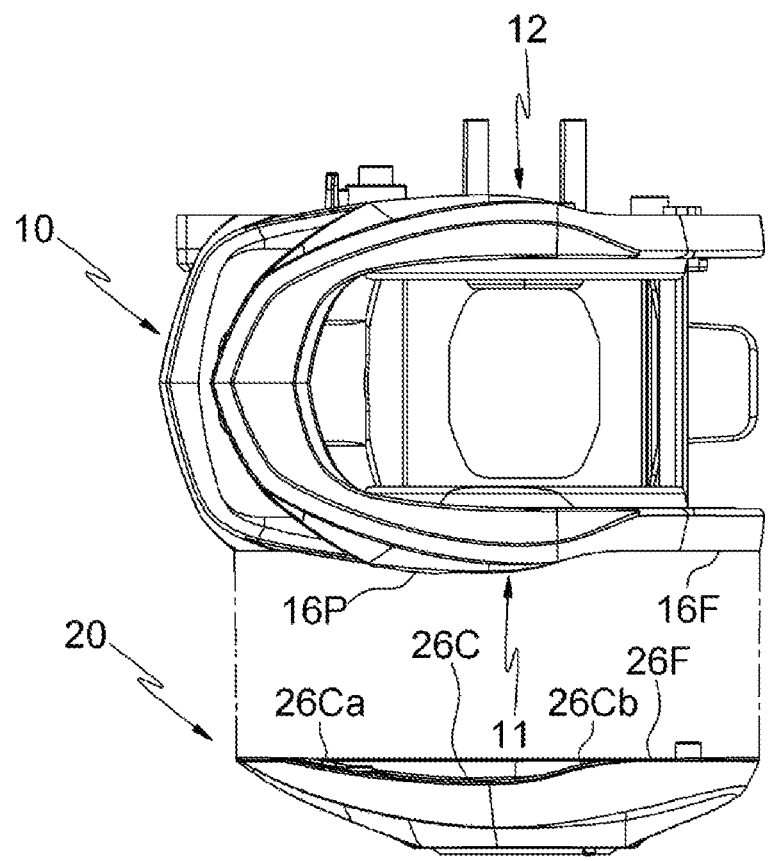
Figure 3:
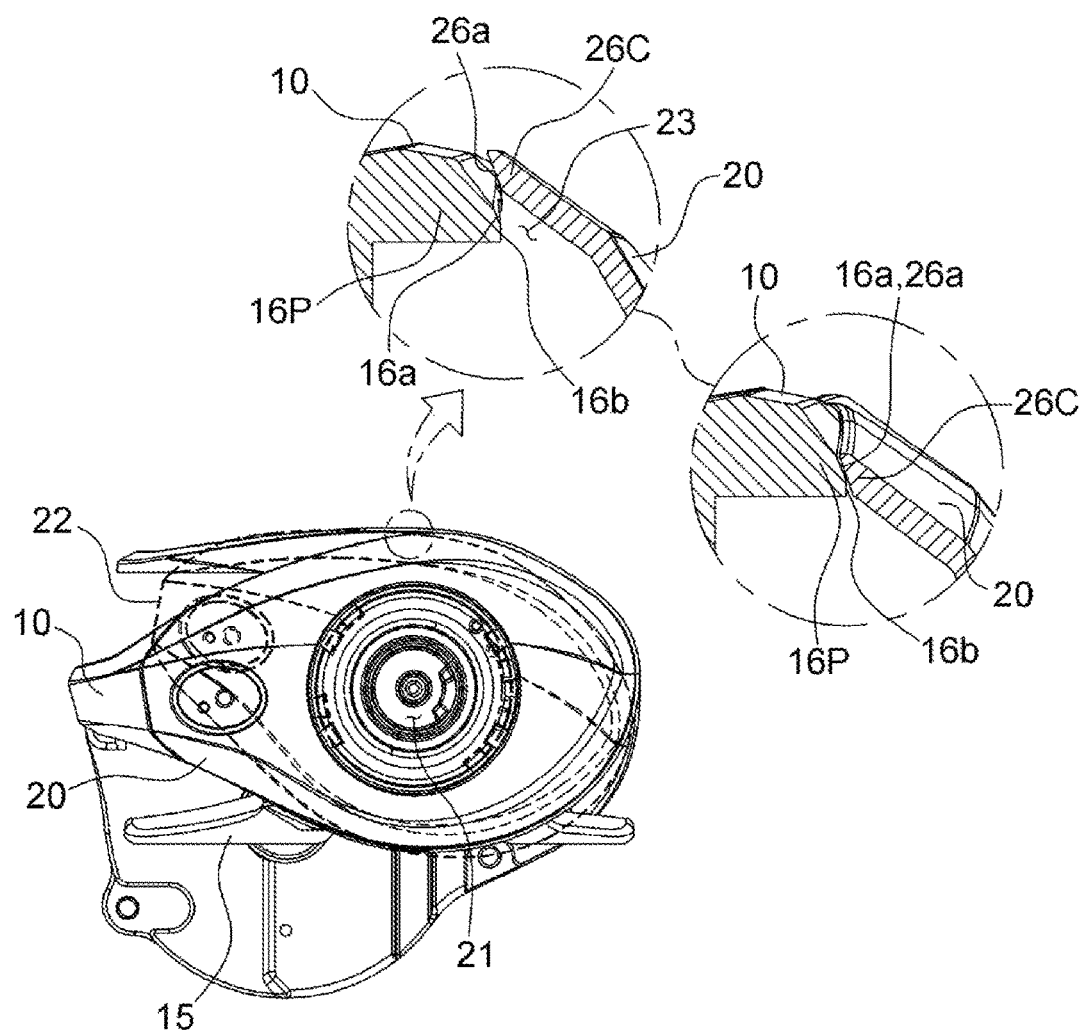
FIG. 3 shows a side view of the fishing reel according to the present invention and cross-sectional view of main parts.

For convenience of the description of a fishing reel having a downward-rotation locking type side cover according to the present invention, when an approximate direction rather than a precise direction is specified with reference to FIGS. 1 and 2, when seeing a front 10A of a frame 10, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereafter, a fishing reel having a downward-rotation locking type side cover according to the present invention will be described with reference to the accompanying drawings.

The present invention relates to a fishing reel having a downward-rotation locking type side cover, which, as shown in FIGS. 1 to 7, largely includes a frame 10 on which a spool (not shown) is mounted, a palm-side first side cover 20 and gear-side second side cover 30 that are respectively coupled to both sides of the frame 10.

A spool, a shaft, a handle, a spool cover, and various braking members except for the main parts of the present invention are not shown in the drawings for the convenience of understanding the present invention and the present invention may include all parts that can be applied to fishing reels known in the art, particularly, bait casting reels unless they influence the main mechanical configuration of the present invention.

First, the frame 10 has first and second mounts 11 and 12 that are open on both sides thereof and a third mount 13 in which the spool is mounted between the first and second mounts 11 and 12.

The first side cover 20 is coupled to the first mount 11 on a first side of the frame 10, thereby protecting a braking member such as a spool cover, a brake shoe, or a magnet brake inside the first mount 11.

The second side cover 30 is coupled to the second mount 12 on a second side of the frame 10, thereby protecting parts such as a gear assembly and a tension adjuster that is operated by a tension nut inside the second mount 12.

The first side cover 20 has a dial coupler 21 to which a dial that is coaxially disposed with a spool shaft and adjust the braking force of the braking members is combined.

The second side cover 30 has: a star drag nut that has a shaft coupling portion 31 in which a rotary shaft of a handle is inserted such that the handle is operated with a gear assembly connected with the spool and that adjusts drag power to protect a fishing line by reducing the speed of the fishing line released from the spool when a fish goes away with a hook; and a tension nut that adjusts the casting distance by adjusting the rotational speed of the spool.

The first side cover 20 is frequently opened and closed relative to the second side cover 30, so a plurality of locking protruding portions and locking grooves (not shown) are circumferentially arranged around a shaft-coupling portion to which a spool shaft is coupled on the inner sides of the first mount 11 and the first side cover 20 so that the frame 10 and the first side cover 20 are opened/closed by a locking structure when the first side cover 20 is rotated forward and backward. However, this locking structure with the locking protruding portions and locking groove is well known in the art, so it is not described in detail herein.

The second side cover 30 that is less frequently opened and closed than the first side cover 20 is bolted to the second mount 12 of the frame 10 so that it can be separated from the frame 10, only if necessary.

The mounts of the frame 10 each have a protruding portion smoothly extending and protruding left and right at a predetermined front upper section of the edge thereof further than the other flat section of the edge.

That is, edges forming the mounts on both sides of the frame 10 have a protruding portion extending and protruding smoothly (in a curved line or a curved surface) outward from the mounts at a predetermined portion of the front upper portion of the flat portion that extends straight forward and backward.

Accordingly, the coupling portion of the frame 10 and the side cover does not have a substantially a substantially ⊂⊃-shape having both straight sides in a plan view, but a ⊂⊃-shape with both curved portions on both sides of the front end.

In this case, as described above, since the first side cover 20 designed to be opened/closed by rotating forward/backward and the second side cover 30 is bolted, the side cover 30 is not interfered with by the protrusions when being opened/closed. Accordingly, a protruding portion 16P and a first flat portion 16F of a first edge 16 that forms the first mount 11 of the frame are exemplified hereafter to describe the main configuration of the present invention.

As described above, when the coupling portion of the frame 10 and the first side cover 20 substantially has the ⊂⊃-shape protruding with a curve, in the related art, a first side cover is primarily coupled to the first mount 11 and is then locked by rotating upward the front end of the first side cover to avoid interference due to the protruding portion when the first side cover is rotated forward/backward to be opened/closed.

However, the first side cover 20 of the present invention is locked by rotating downward the front end of the first side cover 20.

In detail, the first edge 16 forming the first mount 11 has a protruding portion 16P (hatched in FIGS. 4 and 5 for the convenience of understanding) smoothly extending such that a portion of the upper front portion protrude from the first flat portion 16F.

Figure 4:
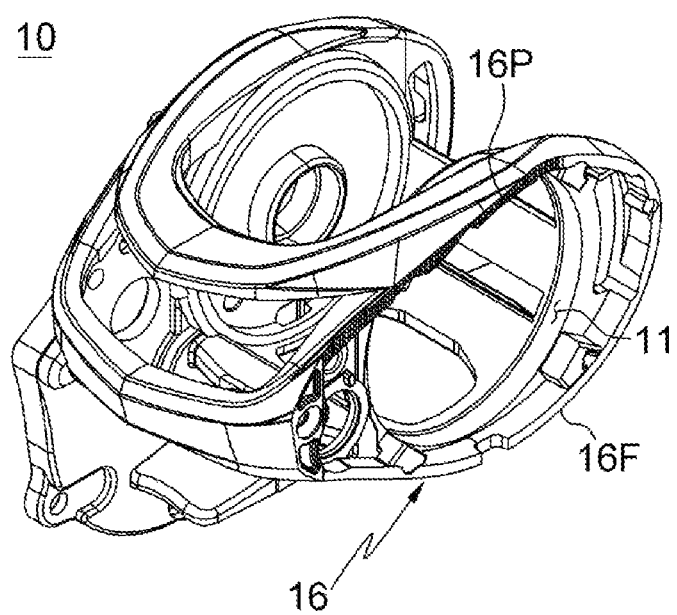
FIGS. 4, 5, 6 and 7 are perspective views and side views showing a frame and a first side cover according to the present invention.
Figure 5:
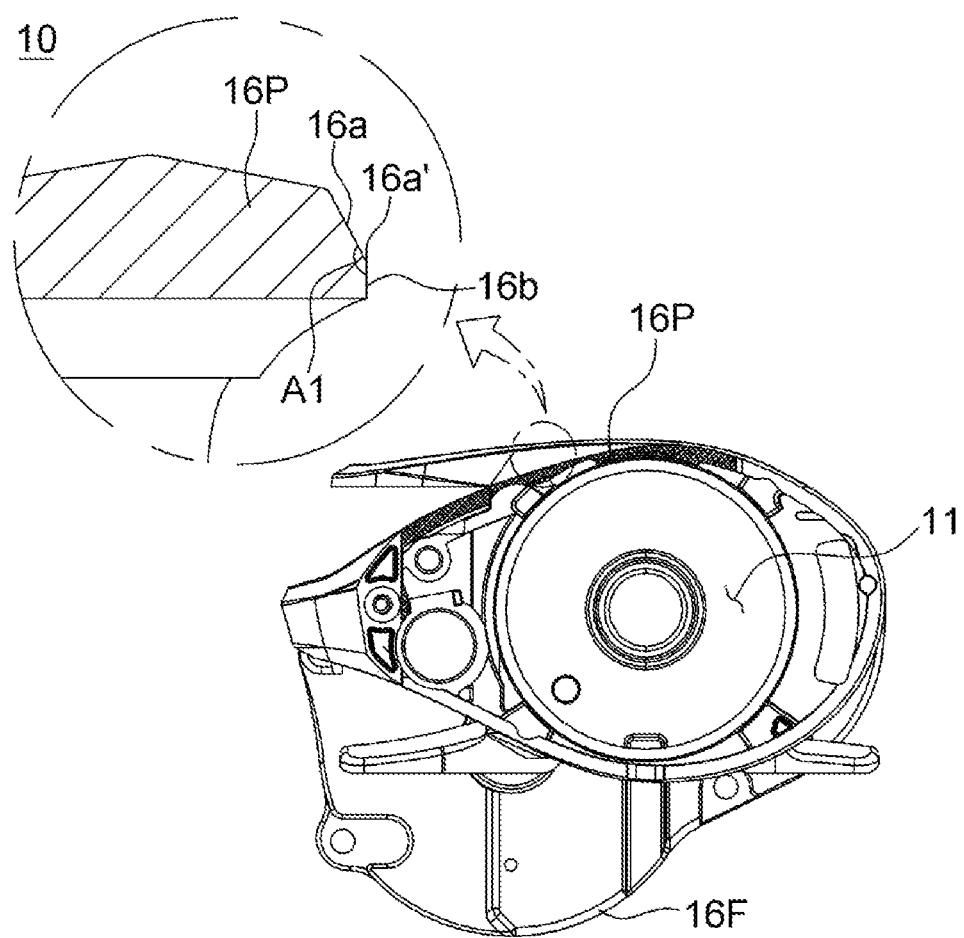
Figure 6:
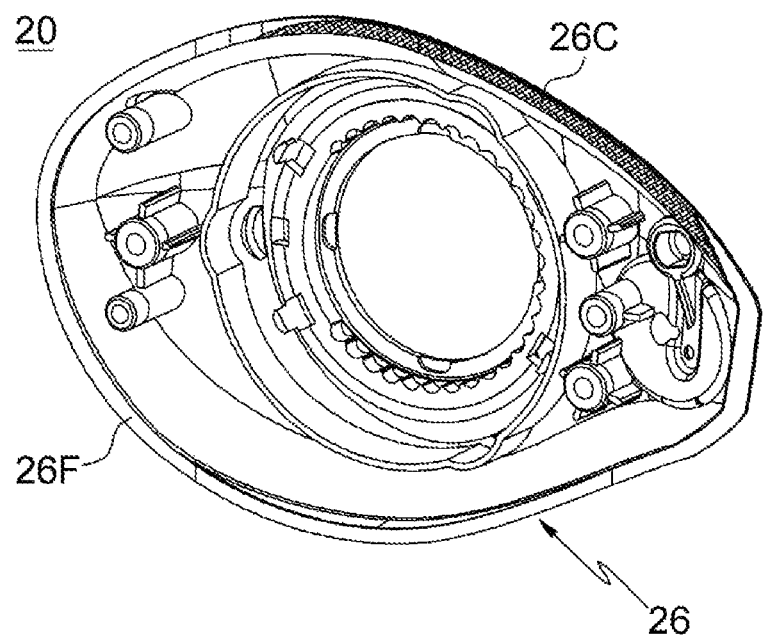
Figure 7:
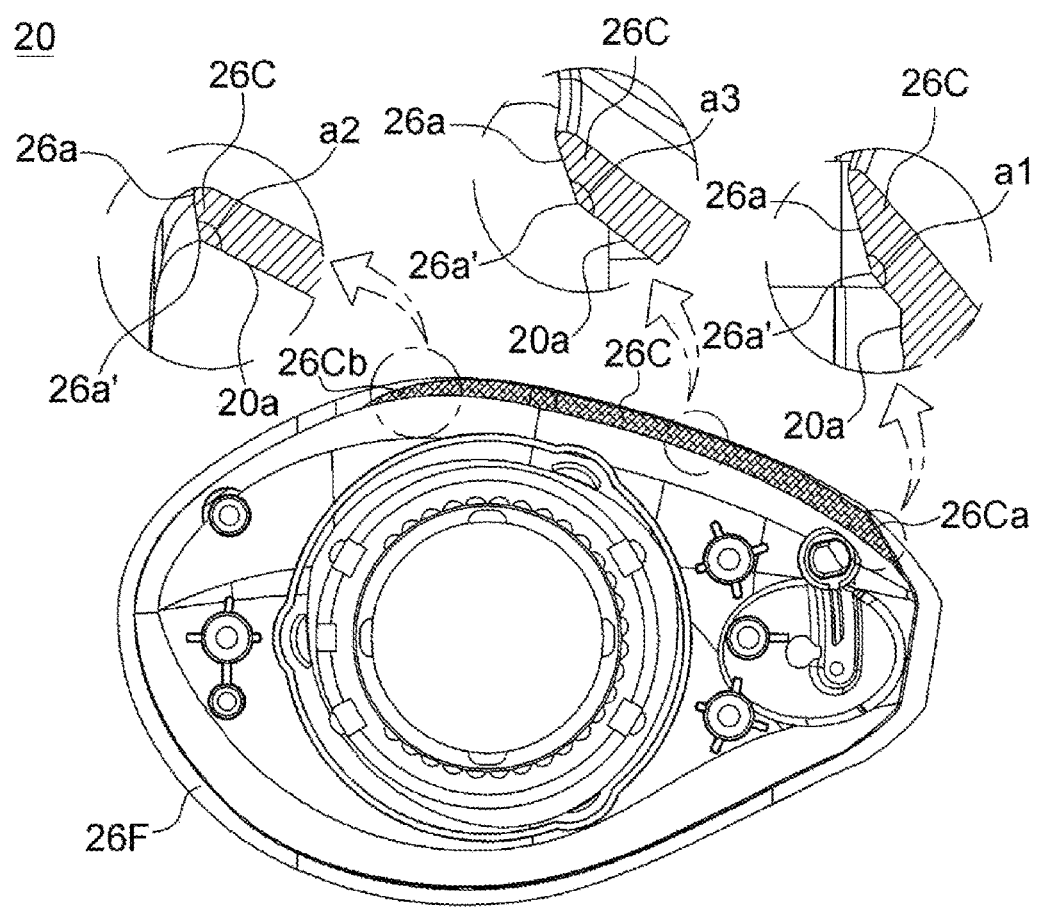
Figure 8A:
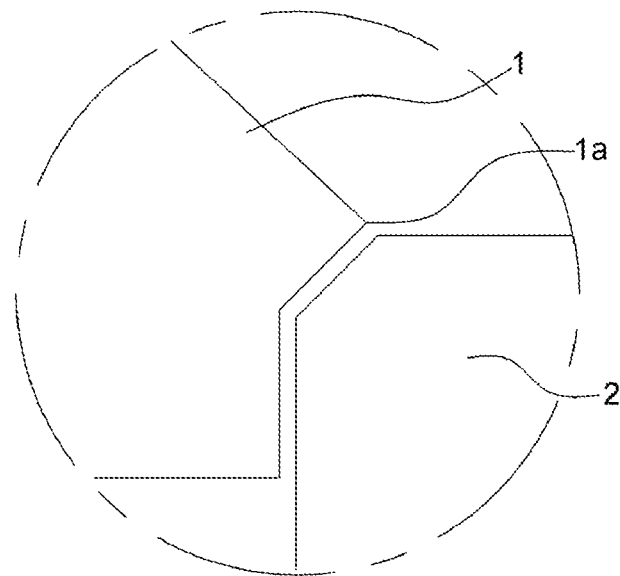
FIGS. 8A and 8B are cross-sectional views schematically showing a contact surface structure between a frame and a side cover of a fishing reel of the related art.
Figure 8B:
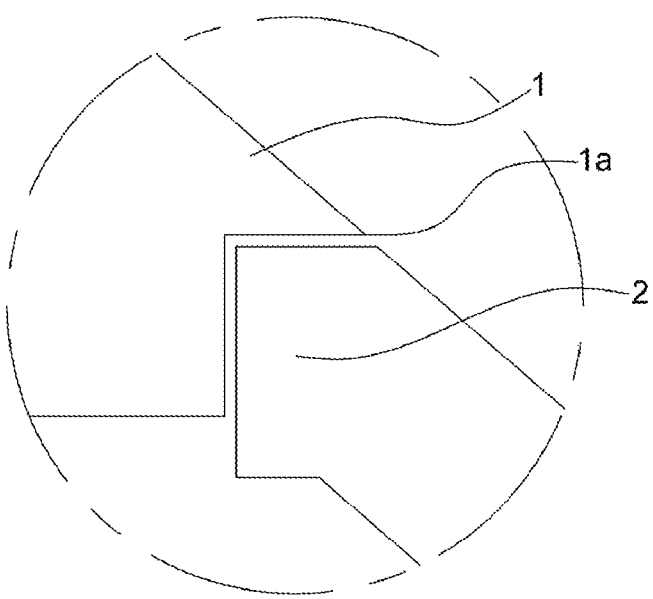

A second edge 26 of the first side cover 20 has a recessed portion 26c extending smoothly such that a portion of the upper front portion is recessed from a second flat portion 26F, and being in contact with the protruding portion 16P (hatched in FIGS. 4 and 5 for the convenience of understanding).

In the protruding portion 16P, the internal angle A1 of a first corner 16a' connecting an upper inclined surface 16a and an outer side 16b is an obtuse angle (≥90°).

The first side cover 20 is primarily coupled to the first mount 11 with the protruding portion 16P under the recessed portion 26C and then the front end of the first side cover 20 is rotated downward, whereby the first side 20 can be locked.

The upper inclined surface 16a of the protruding portion 16P, which is a portion going over the outer side 16b and the first corner 16a', means an outermost inclined surface when the top of the frame 10 as different slopes, as shown in the figures. However, an upper inclined surface having a uniform slope, unlike the figures, should be construed as being inclined in the upper inclined surface 16a of the present invention.

Accordingly, unlike fishing reels substantially having a ⌒-shaped curved design in the related art, according to the present invention, there is no interference or contact by the protruding portion 16P even if the downward-rotation locking type first side cover 20 is applied. Further, the end of the frame 10 is not pointed and the thumb holding the first side cover 20 is positioned on the top opposite to the opening/closing direction of the first side cover 20, so it is possible to prevent injury such as cutting or sticking to the user's finger when using the fishing reel.

The first side cover 20 has an inner contact surface 26a extending from an end of the inner side 20a at an angle corresponding to the slope of the upper inclined surface 16a of the first edge 16, so the inner contact surface 26a is in contact with the upper inclined surface 16a when the first side cover 20 is locked.

That is, in the first side cover 20 having left and right ends that are formed in a D-shape, the inner contact surface 26a extending at a different angle from the inner side 20a is formed at an end of the inner side 20a of the first side cover 20 and the internal angles a1, a2, and a3 at a second corner 26a' connecting the inner side 20a and the inner contact surface 26a of the first side cover 20 are obtuse angle corresponding to the internal angle A1 of the first corner 16a'.

When the first side cover 20 is locked, the recessed portion 26C covers the protruding portion 16P.

Accordingly, the force for coupling the first side cover 20 and the function of preventing infiltration of water that may be deteriorated by employing the curved design can be compensated and improved.

Furthermore, the first side cover 20 has a receiving portion that is an empty space inside the recessed portion 26C to prevent interference by the protruding portion 16P formed inside the first side cover 20 when the first side cover 20 is rotated forward/backward to be opened/closes.

According to the present invention, the protruding portion 16P can be prevented from coming in contact with the inner side 20a of the first side cover 20 or other parts through the receiving portion 23 by the inner contact surface 26a, even though the protruding portion 16P is received inside the first side cover 20.

Furthermore, the inner contact surface 26a of the recessed portion 26C may be formed in an arc shape in which the ends of the front and rear portions 26Ca and 26Cb are connected to the inner end of the second flat portion 2 6F of the second edge 26 and the inner contact surface 26a increases in width and slope with respect to the vertical direction as it goes to the center.

That is, the inner contact surface 26a of the recessed portion 26C gradually increases in width toward the center from the ends of the front and rear portions 26Ca and 26Cb and the slope of the inner contact surface 26 to a vertical line increases as it goes to the center from the ends of the front and rear portions 26Ca and 26Cb.

Accordingly, the first edge 16 of the frame 10 is spirally connected to the upper inclined surface 16a of the protruding portion 16P inclined horizontally and diagonally at the first vertically flat portion 16F (that is, the first flat portion 16F and the upper inclined surface 16a are twisted), whereby the slope of the upper inclined surface 16a is changed.

Accordingly, the entire upper inclined surface 16a of the protruding portion 16P can be covered in close contact with the inner contact surface 26a.

According to this mechanical design, friction between the upper inclined surface 16a and the inner contact surface 26a when the first side cover 20 is rotated forward/backward to be opened/closed can be minimized.

Furthermore, an opening/closing guide that horizontally moves the first side cover to the left and right with respect to the frame 10 when the first side cover 20 is rotated forward/backward to be opened/closed may be disposed inside one or both of the first mount 11 and the first side cover 20.

That is, the opening/closing guide horizontally moves the first side cover 20 in the axial direction of a shaft when the first side cover 20 is rotated forward/backward to be opened or closed.

Therefore, according to the present invention, the first side cover 20 is horizontally moved toward the first mount 11 when it is rotated downward with the first and second edges 16 and 26 spaced a predetermined distance apart from each other, whereby the first side cover 20 is primarily coupled.

In contrast, when the first side cover 20 that has been locked is rotated downward, the first side cover 20 is horizontally moved away from the first mount 11, so the first and second edges 16 and 26 are moved away from each other, whereby the first side cover 20 can be easily attached and detached.

The opening/closing guide may be implemented in various structures within the forward/backward rotation range of the first side cover 20 and can physically press the first side cover 20 in contact with each other so that the first side cover 20 can be horizontally moved to the left and right with rotation.

Representatively, the inner contact surface 26a can function as the opening/closing guide.

As described above, since the slope of the inner contact surface 26a to a vertical line increases as it goes to the center from the front and rear portions 26Ca and 26Cb.

Accordingly, when the first side cover 20 is primarily coupled to the first mount 11 at an angle rearward, the center of the inner contact surface 26a that is relatively largely inclined (that is, is relatively far from the vertical lien) comes first in contact with the end of the upper inclined surface 16a, so the second edge 26 except for the contact portion is spaced a predetermined distance away from the first edge 16.

Further, when the first side cover 20 is rotated forward and downward to be locked, the portion being in contact with the upper inclined surface 16a moves to the inner contact surface 26a of the front portion 26Ca that has a relatively small slope (that is, is relatively close to the vertical line). Accordingly, the first side cover 20 is coupled by horizontally moving to the first mount 11 with downward rotation.

On the contrary, when the first side cover 20 is rotated upward and downward to be opened, the portion being in contact with the upper inclined surface 16a moves toward the center having a relatively large slope along the inner contact surface and the first side cover 20 is pushed with the first and second edges 16 and 26 in contact with each other. Accordingly, the first side cover 20 is separated while horizontally moving away (outward) from the first mount 11 with upward rotation.

The inner contact surface 26a can function as an opening/closing guide due to the different slopes.

Alternatively, though not shown in the figures, as the opening/closing guide, it may be possible to form a protrusion on the inner side 20a of the first side cover 20 and form a guiding portion, which is inclined upward and outward as it goes from the front end to the rear end along a rotational path of the first side cover 20, at the first mount (or the protrusion and the guide portion may be exchanged). Accordingly, the first side cover 20 can be horizontally moved to the left and right with rotation due to a change in slope of the guide portion.

As described above, the opening/closing guide of the present invention can be achieved in various ways.

The structure in which the slope of the portion where the frame 10 and the first side cover 20 physically come in contact with each other is changed so that the first side cover 20 is horizontally moved can be sufficiently expected and achieved by those skilled in the art even though it is not limited to a specific type, so it does not limit the spirit of the present invention.

Although a fishing reel having a downward-rotation locking type side cover having a specific shape and structure with reference to the accompanying drawings, the present invention may be changed, modified, and replaced in various ways by those skilled in the art, and the change, modification, and replacement should be construed as being included in the protective range of the present invention.

What is claimed is:

1. A fishing reel comprising:
   a frame having first and second mount on both sides;
   a palm-side first side cover coupled to the first mount; and
   a gear-side second side cover coupled to the second mount,
   wherein a first edge forming the first mount has a protruding portion smoothly extending such that a portion of an upper front portion protrudes from a first flat portion,
   a second edge of the first side cover has a recessed portion smoothly extending such that an upper front portion is recessed from a second flat portion to be in contact with the protruding portion,
   an internal angle of a first corner connecting an upper inclined surface and an outer side of the protruding portion is an obtuse angle, and
   the first side cover is locked by rotating downward a front end of the first side cover after the first side cover is primarily coupled to the first mount with the protruding portion under the recessed portion.

2. The fishing reel of claim 1, wherein the first side cover has an inner contact surface extending from an end of an inner side at an angle corresponding to a slope of the upper inclined surface of the first edge, and the inner contact surface is in contact with the upper inclined surface when the first side cover is locked.

3. The fishing reel of claim 2, wherein the inner contact surface of the recessed portion is formed in an arc shape in which front and rear ends are connected to inner ends of the second flat portion of the second edge and the inner contact surface increases in width and in slope with respect to a vertical direction as it goes toward a center.

4. The fishing reel of claim 1, wherein an opening/closing guide moving the first side cover to the left and right with respect to the frame when the first side cover is rotated forward/backward to be opened/closed is formed inside one or both of the first mount and the first side cover.

* * * * *